United States Patent
Kanaya

(10) Patent No.: US 10,362,195 B2
(45) Date of Patent: Jul. 23, 2019

(54) IMAGE READING APPARATUS, CONTROL METHOD AND CONTROL PROGRAM

(71) Applicant: PFU LIMITED, Kahoku-shi, Ishikawa (JP)

(72) Inventor: Shingo Kanaya, Kahoku (JP)

(73) Assignee: PFU LIMITED, Kahoku-shi, Ishikawa (JP)

( * ) Notice: Subject to any disclaimer, the term of this patent is extended or adjusted under 35 U.S.C. 154(b) by 0 days.

(21) Appl. No.: 16/097,976

(22) PCT Filed: Jul. 4, 2016

(86) PCT No.: PCT/JP2016/069809
§ 371 (c)(1),
(2) Date: Oct. 31, 2018

(87) PCT Pub. No.: WO2018/008067
PCT Pub. Date: Jan. 11, 2018

(65) Prior Publication Data
US 2019/0098174 A1 Mar. 28, 2019

(51) Int. Cl.
*H04N 1/409* (2006.01)
*H04N 1/19* (2006.01)
*H04N 1/00* (2006.01)

(52) U.S. Cl.
CPC ....... *H04N 1/4097* (2013.01); *H04N 1/00005* (2013.01); *H04N 1/00013* (2013.01);
(Continued)

(58) Field of Classification Search
CPC combination set(s) only.
See application file for complete search history.

(56) References Cited

U.S. PATENT DOCUMENTS

2013/0136315 A1 5/2013 Kawamoto
2013/0278955 A1 10/2013 Shimatani

FOREIGN PATENT DOCUMENTS

JP 2009-253877 A 10/2009
JP 2012-090000 A 5/2012
(Continued)

OTHER PUBLICATIONS

International Search Report and Written Opinion dated Sep. 6, 2016 for corresponding PCT Application No. PCT/JP2016/069809 (7 pages) with English Translation (7 pages).
(Continued)

*Primary Examiner* — Christopher Wait
(74) *Attorney, Agent, or Firm* — Lewis Roca Rothgerber Christie LLP

(57) ABSTRACT

Provided are an image reading apparatus and the like for accurately determining the position where an extraneous substance exists. An image reading apparatus comprises: a first unit having an image capture section for capturing a first image and a second image; a second unit having a reference member placed at a position opposed to the image capture section; a conveying mechanism for conveying an original between the first unit and the second unit such that a front end of the original is in contact with one of the first unit and the second unit; an extraneous substance determination unit that determines whether an extraneous substance is included in the first image and the second image; and a position determination unit that, if an extraneous substance is included in the first image, determines whether the position where the extraneous substance exists is on the first unit side or on the second unit side, on the basis of whether the extraneous substance is included in an area of the second image corresponding to an area of the first image in which the extraneous substance is included. The first image is an image obtained by capturing an image of the reference
(Continued)

member, while the second image is an image obtained by capturing an image of the reference member after the first image is captured and further the original is conveyed thereafter.

12 Claims, 12 Drawing Sheets

(52) U.S. Cl.
CPC ........... *H04N 1/00037* (2013.01); *H04N 1/19* (2013.01); *H04N 1/409* (2013.01)

(56) References Cited

FOREIGN PATENT DOCUMENTS

| | | |
|---|---|---|
| JP | 2012-244500 A | 12/2012 |
| JP | 2013-65949 A | 4/2013 |
| JP | 2013-132042 A | 7/2013 |
| JP | 2013-225822 A | 10/2013 |
| JP | 2014-7482 A | 1/2014 |
| JP | 2014-30143 A | 2/2014 |
| JP | 2015-88814 A | 5/2015 |

OTHER PUBLICATIONS

International Preliminary Report on Patentability dated Jan. 8, 2019 for corresponding PCT Application No. PCT/JP2016/069809 (5 pages) with English Translation (7 pages).

IMAGE READING APPARATUS, CONTROL METHOD AND CONTROL PROGRAM

CROSS-REFERENCE TO RELATED APPLICATION(S)

This application is a U.S. National Phase Patent Application and claims priority to and the benefit of International Application Number PCT/JP2016/069809, filed on Jul. 4, 2016, the entire contents of which are incorporated herein by reference.

FIELD

The present disclosure relates to image reading apparatus, control method and control program, and more particularly, image reading apparatus, control method and control program for detecting a foreign object appearing in an image.

BACKGROUND

Typically, while transferring a document, an image reading apparatus such as a scanner captures an image of the document, using an image capturing device such as a line sensor with imaging elements arranged one-dimensionally. For this reason, a foreign object such as paper powder, dust and paste, etc., attached to a glass surface of the image capturing device may cause vertical stripe noise to appear on a document image acquired by capturing the document.

A printer system that reads a white reference plate and a blank region of a print document, discriminates whether the white reference plate or contact glass is a source of detected dirt, based on the obtained dirt detection result, and displays a position of the dirt and a cleaning instruction is disclosed (see patent literature 1).

CITATIONS LIST

Patent Literature

Patent literature 1: Japanese Unexamined Patent Publication (Kokai) No. 2013-132042

SUMMARY

It is necessary for an image reading apparatus to appropriately correct a document image such that vertical stripe noise does not appear in the document image. Typically, various characters, pictures, illustration patterns, or the like have been printed on a document, making it difficult to correctly determine whether or not a foreign object appears in the document image. On the other hand, using a captured image of a plain reference plate arranged at a position facing an image capturing device and that has been acquired when a document is not transferred makes it possible to accurately determine whether or not a foreign object appears in the document image. When a foreign object appears in the captured image of the reference plate, it is however difficult to correctly determine whether the foreign object exists on an image capturing device side or on a reference plate side. Whether or not vertical stripe noise appears in a document image depends on a position of a foreign object. For this reason, accurate determination of a position of a foreign object is demanded for appropriately correcting a document image.

It is an object of image reading apparatus, control method, and control program is to accurately determine a position of a foreign object.

The image reading apparatus according to an embodiment includes a first unit including an image capturing device for capturing a first image and a second image, a second unit including a reference member provided at a position facing the image capturing device, a conveyance mechanism for conveying a document between the first unit and the second unit so that a leading edge of the document comes into contact with one of the first unit and the second unit, a foreign object determining module for determining whether a foreign object appears in the first image and the second image, and a position determining module for determining, when a foreign object appears in the first image, whether the foreign object exists on a side of the first unit or on a side of the second unit, based on whether a foreign object appears in a region included in the second image and corresponding to a region where the foreign object appears in the first image. The first image is a captured image of the reference member, and the second image is an image of the reference member captured after the first image is captured and then a document is conveyed.

The control method according to an embodiment is a method of an image reading apparatus including a first unit including an image capturing device for capturing a first image and a second image, a second unit including a reference member provided at a position facing the image capturing device, and a conveyance mechanism for conveying a document between the first unit and the second unit so that a leading edge of the document comes into contact with one of the first unit and the second unit. The method includes determining whether a foreign object appears in the first image and the second image, and determining, when a foreign object appears in the first image, whether the foreign object exists on a side of the first unit or on a side of the second unit, based on whether a foreign object appears in a region included in the second image and corresponding to a region where the foreign object appears in the first image. The first image is a captured image of the reference member, and the second image is an image of the reference member captured after the first image is captured and then the document is conveyed.

The control program according to an embodiment is a program of an image reading apparatus including a first unit including an image capturing device for capturing a first image and a second image, a second unit including a reference member provided at a position facing the image capturing device, and a conveyance mechanism for conveying a document between the first unit and the second unit so that a leading edge of the document comes into contact with one of the first unit and the second unit. The program causes the image reading apparatus to execute determining whether a foreign object appears in the first image and the second image, and determining, when a foreign object appears in the first image, whether the foreign object exists on a side of the first unit or on a side of the second unit, based on whether a foreign object appears in a region included in the second image and corresponding to a region where the foreign object appears in the first image. The first image is a captured image of the reference member, and the second image is an image of the reference member captured after the first image is captured and then the document is conveyed.

According to the present embodiment, the image reading apparatus, the control method, and the control program can accurately determine a position of a foreign object.

The object and advantages of the invention will be realized and attained by means of the elements and combinations, in particular, pointed out in the claims. It is to be understood that both the foregoing general description and the following detailed description are exemplary and explanatory, and are not restrictive of the invention, as claimed.

DESCRIPTION OF EMBODIMENTS

Hereinafter, a document conveying apparatus according to an embodiment, will be described with reference to the drawings. However, it should be noted that the technical scope of the invention is not limited to these embodiments, and extends to the inventions described in the claims and their equivalents.

Figure 1:
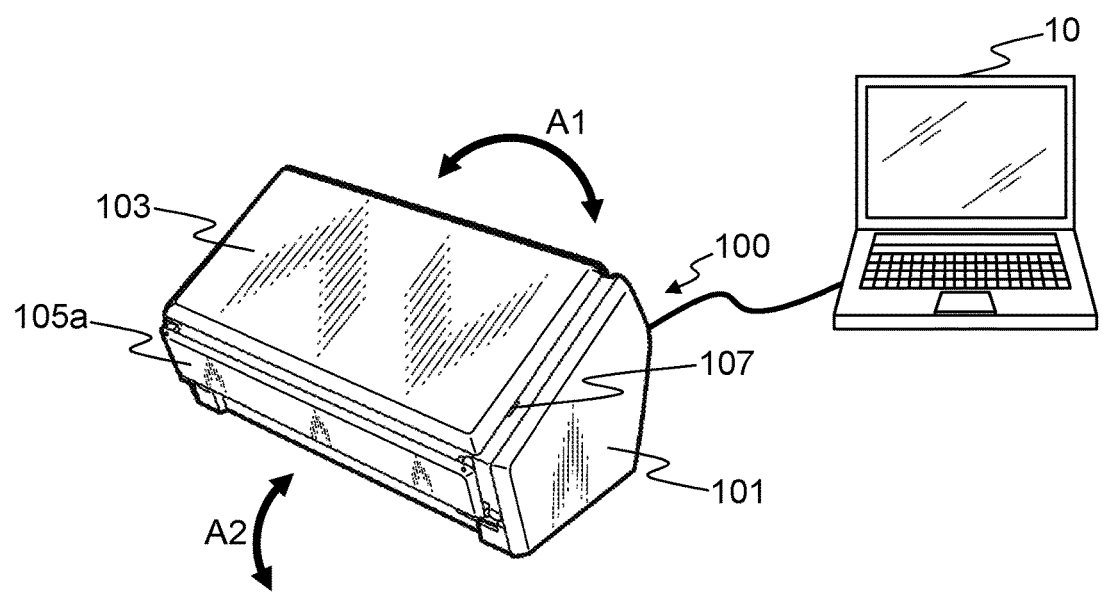
FIG. 1 is a configuration diagram of one example of an image processing system according to an embodiment.

FIG. 1 illustrates a configuration diagram of one example of the image processing system according to an embodiment.

The image reading apparatus of a present embodied example is configured as an image reading apparatus 100 such as an image scanner. The image processing system 1 includes the image reading apparatus 100 and an information processing apparatus 10. In FIG. 1, the image reading apparatus 100 is depicted by a perspective illustration.

The image reading apparatus 100 includes a lower housing 101, an upper housing 102, a document tray 103, a front surface cover 105a, an opening/closing detector 107, and the like. The image reading apparatus 100 is connected to the information processing apparatus 10. The image processing apparatus 10 is a personal computer, or a personal digital assistant, for example.

Figure 2:
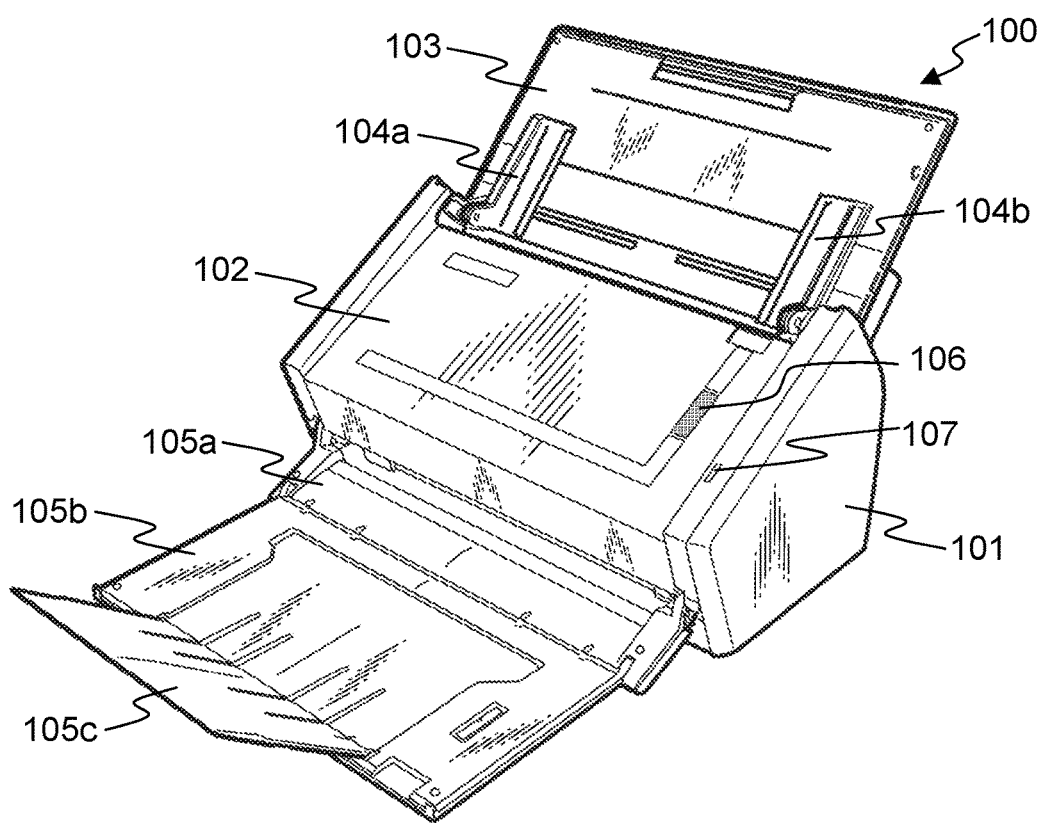
FIG. 2 is a perspective view of an image reading apparatus 100 to which a document tray 103 has been set.

FIG. 2 is a perspective view of the image reading apparatus 100 where the document tray 103 is set.

The image reading apparatus 100 includes an upper surface cover 105b, an auxiliary cover 105c, and operation button 106. The document tray 103 engages the lower housing 101 by hinges so as to be rotated in the direction indicated by the arrow A1. In a state of FIG. 1, the document tray 103 is arranged at a position where the document tray 103 covers the upper housing 102, the upper surface cover 105b, and the auxiliary cover 105c. Thus, the document tray 103 functions as an exterior cover.

On the other hand, in the state as depicted in FIG. 2, the document tray 103 is arranged such that documents can be placed on the document tray 103. Provided in the document tray 103 are side guides 104a and 104b that are movable in the right and left directions of the conveyance direction of a document. The side guides 104a and 104b are aligned with a width of a document to restrict the document in the width direction of the document.

The front surface cover 105a engages the lower housing 101 by hinges so as to be rotated in the direction indicated by the arrow A2. The upper surface cover 105b is connected at one end to the front surface cover 105a, and is connected at the other end to the auxiliary cover 105c. When it is necessary, the auxiliary cover 105c is let out from the upper surface cover 105b to hold a document.

The operation button 106 is arranged on the surface of the upper housing 102, which button generates and outputs an operation detection signal by pressing down. The opening/closing detector 107 includes a contact detecting sensor arranged at a position that faces the document tray 103 in a closed state, and detects an opened state and a closed state of the document tray 103. The opening/closing detector 107 generates and outputs an opening/closing detection signal of which signal value changes by the state of the document tray 103 whether it is open or closed.

Figure 3:
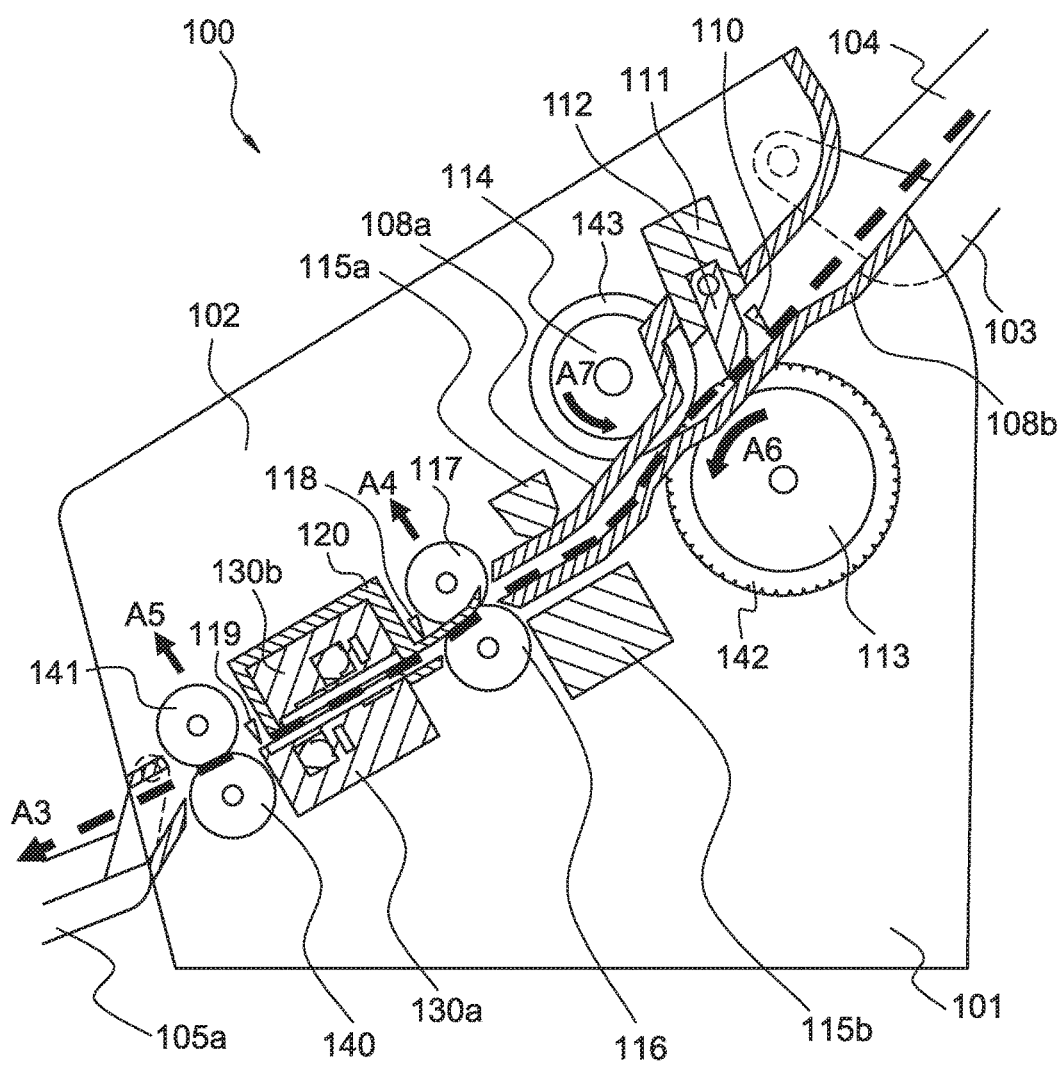
FIG. 3 is a diagram illustrating a transfer path inside the image reading apparatus 100.

FIG. 3 illustrates a conveyance path inside the image reading apparatus 100. The image reading apparatus 100 includes a first sensor 110, a pick arm 111, a flap 112, a sheet feeding roller 113, a retard roller 114, an ultrasonic wave transmitter 115a, an ultrasonic wave receiver 115b, a first conveyance roller 116, and a first driven roller 117. The image reading apparatus 100 includes a second sensor 118, a third sensor 119, an imaging unit guide 120, a first imaging unit 130a, a second imaging unit 130b, a second conveyance roller 140, a second driven roller 141, and the like.

A lower surface of the upper housing 102 forms an upper guide 108a of the document conveyance path, and an upper surface of the lower housing 101 forms a lower guide 108b of the document conveyance path. In FIG. 3, the arrow A3 indicates the conveyance direction of a document. In the following, the term "upstream" means "upstream in the conveyance direction A3", and the term "downstream" means "downstream in the conveyance direction A3". The first sensor 110 is a contact detecting sensor, and is arranged in the upstream side of the pick arm 111, and detects whether or not a document is placed on the document tray 103. The first sensor 110 generates and outputs a first document detection signal of which signal value changes by the state whether or not a document is placed on the document tray 103.

The sheet feeding roller 113 is supported by a main body unit of the image reading apparatus 100 in a rotation-free manner. Provided in an outer circumferential surface of the sheet feeding roller 113 is a contact material 142 that contacts a document placed on the document tray 103. The contact material 142 is made of rubber, for example, of which coefficient of friction with a document is large.

The retard roller 114 is arranged to face the sheet feeding roller 113, and restricts so that a document that does not contact the sheet feeding roller 113 is not conveyed in the conveyance direction A3. The retard roller 114 is supported by the main body unit of the image reading apparatus 100 in a rotation-free manner. Provided in an outer circumferential surface of the retard roller 114 is a contact material 143 that contacts a document placed on the document tray 103. The contact material 143 is made of rubber, for example, of which coefficient of friction with a document is large.

The ultrasonic wave transmitter 115a and the ultrasonic wave receiver 115b are arranged near the document conveyance path so as to sandwich the conveyance path and face each other. The ultrasonic wave transmitter 115a transmits an ultrasonic wave. On the other hand, the ultrasonic wave receiver 115b detects an ultrasonic wave that has been transmitted by the ultrasonic wave transmitter 115a and has penetrated a document, and generates and outputs an ultrasonic wave signal that is an electrical signal depending on the detected ultrasonic wave. In the following, the ultrasonic wave transmitter 115a and the ultrasonic wave receiver 115b may be collectively referred to as an ultrasonic sensor 115.

The first conveyance roller 116 and the first driven roller 117 are respectively supported by the main body unit of the image reading apparatus 100 in a rotation-free manner. The first conveyance roller 116 and the first driven roller 117 are arranged on the upstream side of the first imaging unit 130a and the second imaging unit 130b. The first driven roller 117 is arranged above the first conveyance roller 116 to face the first conveyance roller 116. The first conveyance roller 116 is fixed, and the first driven roller 117 is arranged so as to be movable upward (in the direction of the arrow A4) relative to the first conveyance roller 116.

The second conveyance roller 140 and the second driven roller 141 are respectively supported by the main body unit of the image reading apparatus 100 in a rotation-free manner. The second conveyance roller 140 and the second driven roller 141 are arranged on the downstream side of an imaging unit 130. The second driven roller 141 is arranged above the second conveyance roller 140 to face the second conveyance roller 140. The second conveyance roller 140 is fixed, and the second driven roller 141 is arranged so as to be movable upward (in the direction of the arrow A5) relative to the second conveyance roller 140.

Each of a set of the sheet feeding roller 113 and the retard roller 114, a set of the first conveyance roller 116 and the first driven roller 117, and a set of the second conveyance roller 140 and the second driven roller 141 is one example of a conveyance module which conveys a document.

Figure 4:
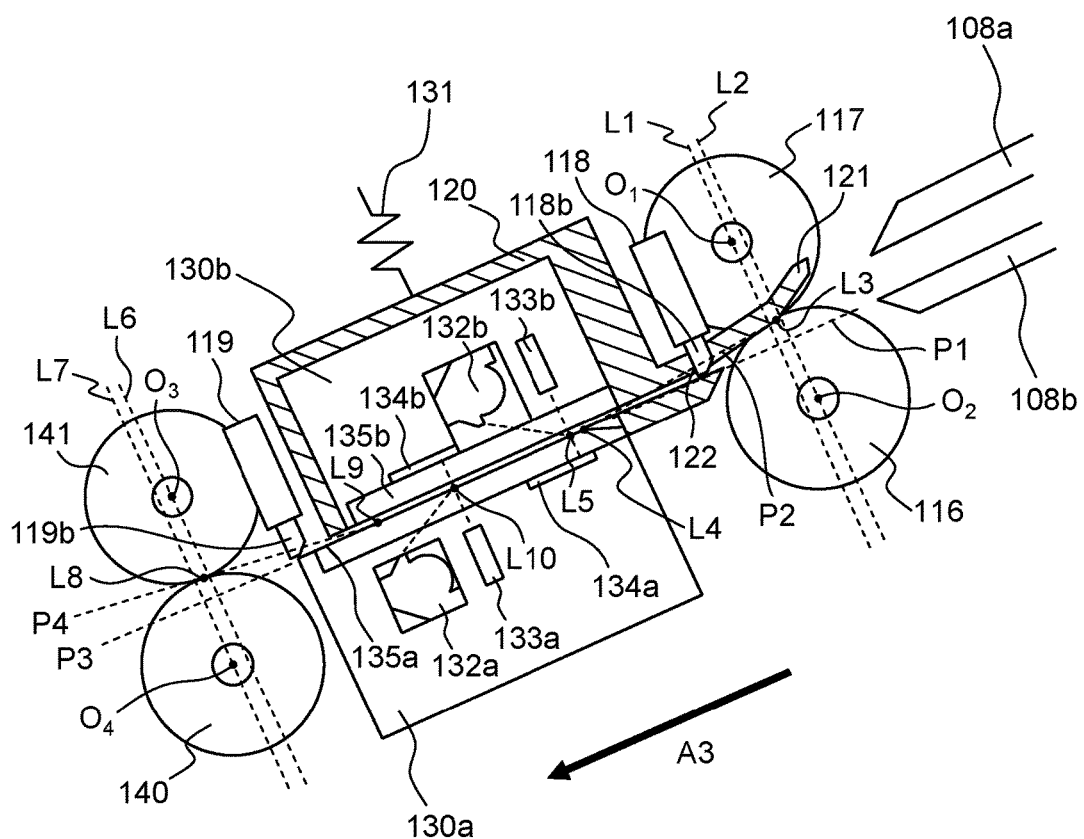
FIG. 4 is a diagram illustrating an imaging unit 130 etc.

FIG. 4 illustrates the first imaging unit 130a, the second imaging unit 130b, and the imaging unit guide 120. The first imaging unit 130a captures an image of a front surface of a conveyed document, and the second imaging unit 130b captures an image of a back surface of the conveyed document. The second imaging unit 130b is arranged above the first imaging unit 130a to face the first imaging unit 130a. The second imaging unit 130b includes the imaging unit guide 120 for guiding and conveying a document between the first imaging unit 130a and the second imaging unit 130b. In the following, the first imaging unit 130a and the second imaging unit 130b may be collectively referred to as the imaging unit 130.

The first imaging unit 130a is fixed to the lower housing 101. On the other hand, the second imaging unit 130b is supported by the upper housing 102 so as to be movable in the direction perpendicular to the conveyance path. The second imaging unit 130b includes a pushing spring 131 at an upper position thereof. The pushing spring 131 pushes the second imaging unit 130b toward the first imaging unit 130a. When there is no document at the conveyance path, pushing force of the pushing spring 131 returns the second imaging unit 130b back to an initial position. In other words, the second imaging unit 130b is provided to be able to move between an initial position facing the first imaging unit 130a and a position facing the first imaging unit 130a and more separated from the first imaging unit 130a than the initial position. The initial position of the second image capturing unit 130b will sometimes be referred to as a first position, and a position distant from the first image capturing unit 130a will sometimes be referred to as a second position hereinafter.

When the second imaging unit 130b is at the first position, a width of a gap between the first imaging unit 130a and the second imaging unit 130b facing each other is larger than the thicknesses of a copy paper sheet, a print paper sheet, a photo paper sheet, and the like. For this reason, the second imaging unit 130b does not move from the initial position after any of these sheets are conveyed.

The first imaging unit 130a includes a first light source 132a, a first image capturing device 133a, a first reference member 134a, a first glass surface 135a, and the like. The second imaging unit 130b includes a second light source 132b, a second image capturing device 133b, a second reference member 134b, a second glass surface 135b, and the like. In the following, the first image capturing device 133a and the second image capturing device 133b may be collectively referred to as an image capturing device 133. The first reference member 134a and the second reference member 134b may be collectively referred to as a reference member 134.

The first light source 132a includes light emitting diodes (LEDs) of respective colors RGB and a light guiding material, and emits an illuminating light to a document surface. When there is no document at an illuminating position, the second reference member 134b of the second imaging unit 130b is irradiated with illuminating light. Similarly, the second light source 132b includes LEDs of respective colors RGB and a light guiding material, and emits an illuminating light to a document surface. When there is no document at an illuminating position, the first reference member 134a of the first imaging unit 130a is irradiated with illuminating light.

The first image capturing device 133a and the second image capturing device 133b are an example of an image capturing module. The first image capturing device 133a includes a contact image sensor (CIS) that is a unit-magnification optical system that includes an imaging element constituted by charge coupled devices (CCDs) that are linearly arranged in a main scanning direction. The first image capturing device 133a reads a front surface of a document to generate and output an image signal. The second image capturing device 133b includes a CIS that is a unit-magnification optical system that includes an imaging element constituted by CCDs that are linearly arranged in a main scanning direction. Alternatively, instead of the CCDs, complementary metal oxide semiconductors (CMOSs) may be used. Further, alternatively, instead of the CIS, an image sensor that is an optical reduction system can be used.

The first reference member 134a is a white reference plate, and is arranged at a position facing the second image capturing device 133b. When a document is not conveyed to the imaging unit 130, the second image capturing device 133b captures an image of the first reference member 134a to generate an image signal. Similarly, the second reference member 134b is arranged at a position facing the first image capturing device 133a of the first imaging unit 130a. When a document is not conveyed to the imaging unit 130, the first image capturing device 133a captures an image of the second reference member 134b to generate an image signal. On the basis of the image signals generated by capturing the images of the first reference member 134a and the second reference member 134*b*, the image reading apparatus 100 can perform image correction such as shading, and the like.

Either the first imaging unit 130*a* or the second imaging unit 130*b* may be omitted. In this case, in place of the omitted imaging unit, a transfer roller functioning as the reference member may be provided.

The guide member 121 is provided to the imaging unit guide 120. The guide member 121 is an example of a conveyance mechanism and documents are guided and conveyed between the first imaging unit 130*a* and the second imaging unit 130*b* so that the leading edge of the document contacts with a surface of the first imaging unit 130*a*.

The second sensor 118 is a contact detecting sensor and is placed downstream of the first conveyance roller 116 and the first driven roller 117 and upstream of the imaging unit 130. The second sensor 118 includes a lever portion 118*b* that penetrates a penetration hole 122 in the guide member 121 and detects that a document exists at the position of the lever portion 118*b*. In other words, the second sensor 118 detects that a document exists between a set of the first conveyance roller 116 and the first driven roller 117, and the imaging unit 130 in the document transfer direction A3. The second sensor 118 generates and outputs a second document detection signal having a value that differs between the state in which the lever portion 118*b* is in contact with a document and that in which the lever portion 118*b* is not in contact with the document.

The third sensor 119 is a contact detecting sensor and is placed downstream of the imaging unit 130 and upstream of the second conveyance roller 140 and the second driven roller 141. The third sensor 119 includes a lever portion 119*b* and detects that a document exists at the position of the lever portion 119*b*. In other words, the third sensor 119 detects that a document exists between the imaging unit 130, and a set of the second conveyance roller HO and the second driven roller 141 in the document transfer direction A3. The third sensor 119 generates and outputs a third document detection signal having a value that differs between the state in which the lever portion 119*b* is in contact with a document and that in which the lever portion 119*b* is not in contact with the document.

As illustrated in FIG. 4, a position L1 in a document conveying direction A3 of a center O1, i.e., a rotation axis of a first driven roller 117 is arranged to be shifted to the side of the imaging unit 130 than a position L2 in the document conveying direction A3 of a center O2, i.e., a rotation axis of a first conveyance roller 116. Further, nip positions L3 of the first conveyance roller 116 and the first driven roller 117 are arranged above an extended surface P1 in which a glass surface 135*a* of the first imaging unit 130*a* is extended toward the first conveyance roller 116 and the first driven roller 117. Especially, in the nip positions L3, a position L4 where the tangential plane P2 contacting with the first conveyance roller 116 contacts with the glass surface 135*a* of the first imaging unit 130*a* is arranged such that position L4 is located on an upstream side of an image capturing position L5 of the second image capturing device 133*b* of the second imaging unit 130*b* in the document conveying direction A3.

A position L6 in the document conveying direction A3 of a center O3, i.e., the rotation axis of a second driven roller 141 is arranged to be shifted to the side of the imaging unit 130 than a position L7 in the document conveying direction A3 of a center O4, i.e., the rotation axis of a second conveyance roller 140. Nip positions of the second conveyance roller 140 and the second driven roller 141 are arranged at the same height as the nip positions L3 of the first conveyance roller 116 and the first driven roller 117 with respect to the extended surface P3 in which the glass surface 135*a* is extended toward the second conveyance roller 140 and the second driven roller 141. Especially, in the nip position L8, a position L9 where the tangential plane P4 contacting the second conveyance roller 140 contacts with the glass surface 135*a* of the first imaging unit 130*a* is arranged such that the position L9 is arranged to a downstream side in the document conveying direction A3 than an image capturing position L10 of the first image capturing device 133*a*. An angle of the tangential plane P4 with respect to the glass surface 135*a* is preferably arranged to be the same as an angle of the tangential plane P2 with respect to the glass surface 135*a*.

Figure 5A:
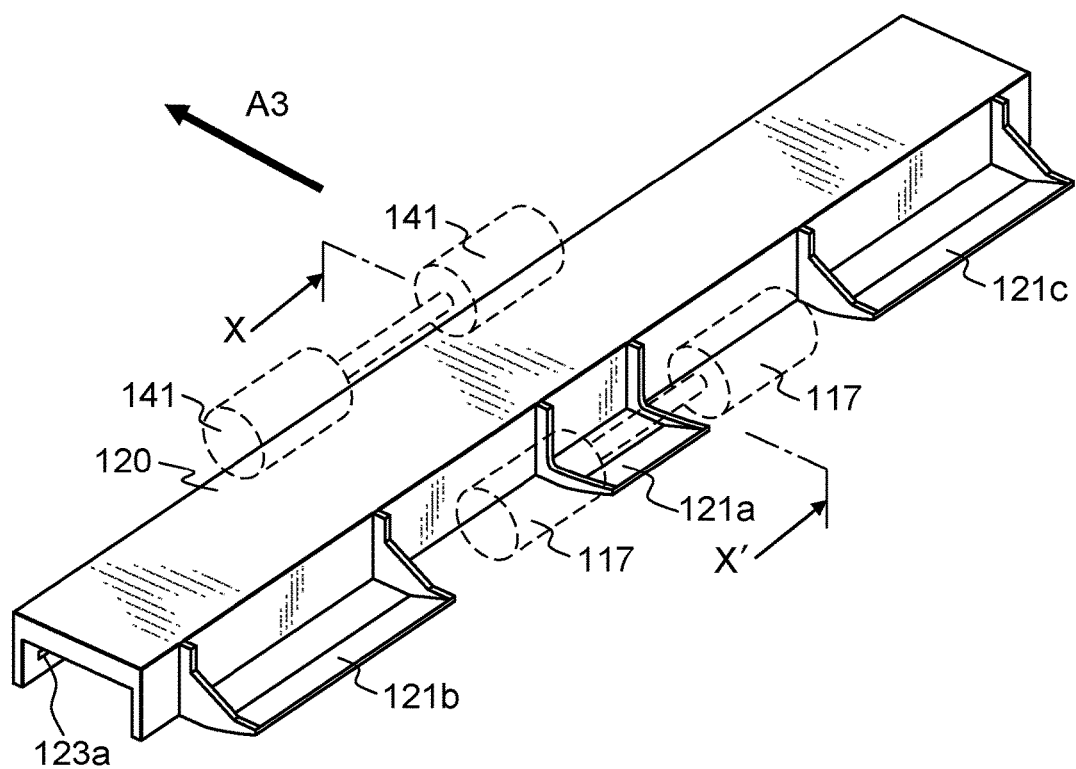
FIG. 5A is a perspective view of an imaging unit guide 120.
Figure 5B:
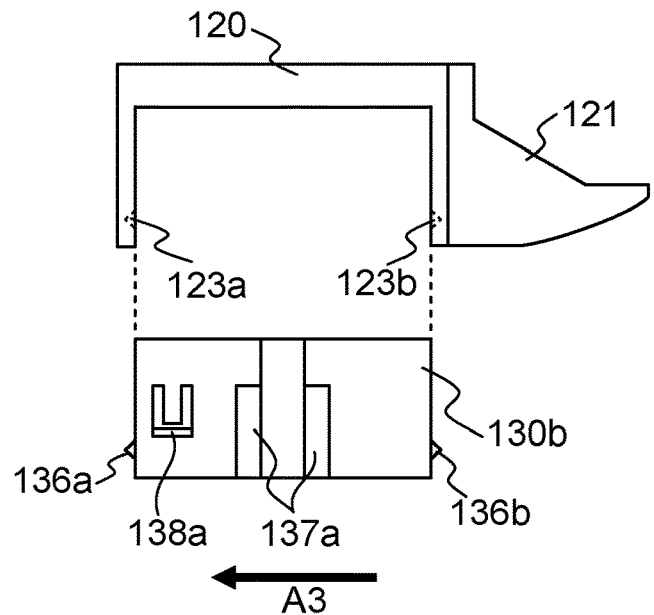
FIG. 5B is a side view of the imaging unit guide 120 etc.
Figure 5C:
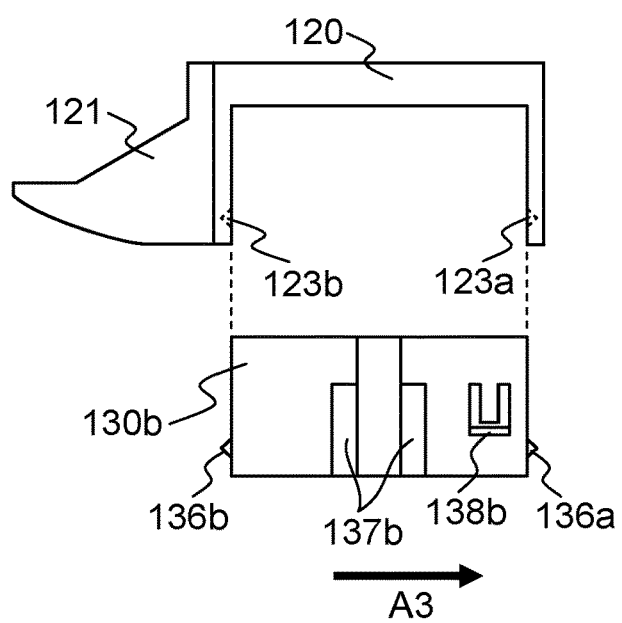
FIG. 5C is a side view of the imaging unit guide 120 etc.

FIG. 5A illustrates a perspective view of the imaging unit guide 120 and FIG. 5B and FIG. 5C illustrate side views of the imaging unit guide 120 and the second imaging unit 130*b*.

As illustrated in FIG. 5A, in the imaging unit guide 120, three guide members 121*a*, 121*b*, and 121*c* are provided in the direction orthogonal to the document conveying direction A3. The first driven roller 117 is arranged between each of the guide members 1121*a*, 121*b*, and 121*c*. Each unit of an image reading apparatus 100 illustrated in FIG. 3 and FIG. 4 illustrates a view of the components of the guide member 121*a* of the imaging unit guide 120 taken along the arrow X-X' in FIG. 5A as viewed in the direction of the arrow X and X'.

As illustrated in FIG. 5B and FIG. 5C, the imaging unit guide 120 covers the second imaging unit 130*b* so that concave portions 123*a* and 123*b* provided to the imaging unit guide 120 are engaged with convex portions 136*a* and 136*b* provided in the second imaging unit 130*b*.

The second imaging unit 130*b* includes a first guide member 137*a* and a first locking member 138*a* on a side surface of one end side in the direction orthogonal to the document conveying direction A3 and includes a second guide member 137*b* and a second locking member 138*b* on a side surface of the other end side.

The first guide member 137*a* and the second guide member 137*b* engage with a rail portion (not illustrated) that is arranged inside the image reading apparatus 100 and extends in a substantially vertical direction with respect to the document conveying direction A3.

The first locking member 138*a* and the second locking member 138*b* engage with a locking portion (not illustrated) arranged in the image reading apparatus 100 so that the falling of the second imaging unit 130*b* is prevented.

Figure 6:
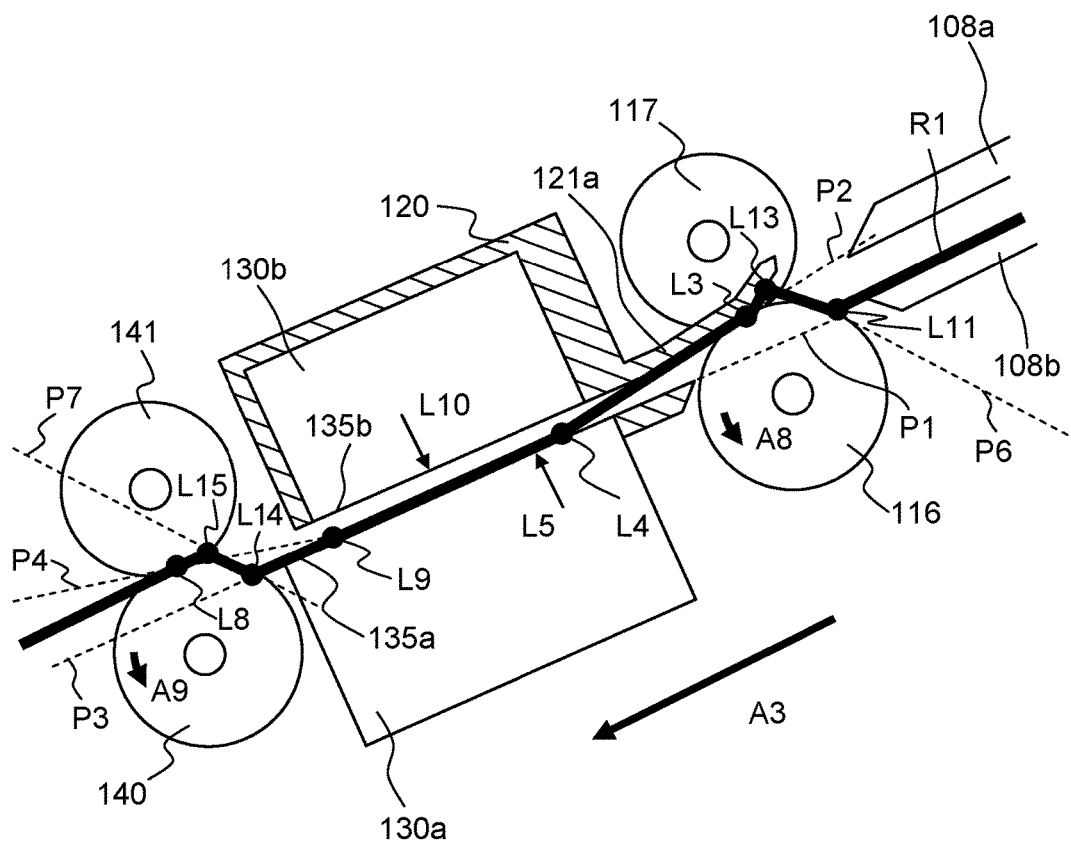
FIG. 6 is a drawing for explaining a state in which the document is conveyed.

FIG. 6 is a drawing for illustrating the state in which the document is conveyed.

FIG. 6 is a view of the components of the guide member 121*a* of the imaging unit guide 120 taken along the arrow X-X' in FIG. 5A as viewed in the direction of the arrow X and X' and a path R1 indicates a path through which ideally a leading edge of the document to be conveyed passes.

By rotating a paper feed roller 113 in a direction of an arrow A6 of FIG. 3, the document placed on a document tray 103 is conveyed between an upper guide 108*a* and a lower guide 108*b* in the document conveying direction A3. When the document is conveyed, a retard roller 114 rotates in a direction of an arrow A7 of FIG. 3. When documents are placed on the document tray 103, by the functions of the paper feed roller 113 and the retard roller 114, among the documents placed on the document tray 103, only the documents contacting with the paper feed roller 113 are separated. Consequently, the conveyance of the documents other than the separated document is restricted (prevention of multifeed).

The leading edge of the document guided by the lower guide 108b contacts the first conveyance roller 116 at the position L11 and is directed upward from the extended surface P1 of the glass surface 135a along the tangential plane P6 of the first conveyance roller 116. Thereafter, a central portion of the leading edge of the document contacts with the guide member 121a of the imaging unit guide 120 at the position L13, at an edge, the leading edge contacts the guide member 121b and the guide member 121c and is directed downward.

The leading edge of the document that is directed downward by the guide members 121a, 121b and 121c is sent between the first conveyance roller 116 and the first driven roller 117. As the first conveyance roller 116 rotates in the direction of an arrow A8, the leading edge of the document passes through the nip positions L3 between the first conveyance roller 116 and the first driven roller 117. Then, the leading edge of the document advances along the tangential plane P2 at the nip positions L3 and at the position L4, contacts the glass surface 135a of the first image capturing device 133a.

The document contacting with the glass surface 135a is curved due to the low rigidity, and the leading edge of the document is conveyed along the glass surface 135a. The leading edge of the document passes between the first imaging unit 130a and the second imaging unit 130b, then advances along the extended surface P3 of the glass surface 135a, and at the position L14, contacts with the second conveyance roller 140. The leading edge of the document that contacts with the second conveyance roller 140 advances along a tangential plane P7 of the second conveyance roller 140 at the position L14 and at the position L15, contacts with the second driven roller 141.

The leading edge of the document that contacts with the second driven roller 141 is sent between the second conveyance roller 140 and the second driven roller 141. As the second conveyance roller 140 rotates in a direction of an arrow A9, the leading edge of the document passes through the nip position L8 between the second conveyance roller 140 and the second driven roller 141 and is discharged to a front cover 105a.

In this way, since the leading edge of the document is conveyed along the glass surface 135a, the cleaning of the glass surface 135a, i.e., the removal of the dust on the glass surface 135a by the leading edge of the document becomes possible.

Depending on the width and the arrangement position etc., of the first conveyance roller 116, the first driven roller 117, and the guide members 121a to 121c, it is possible that the document to be conveyed bends in a main scanning direction and all of the leading edges of the documents do not always need to pass through the path R1. However, at least a part of the leading edge of the document passes through the path R1 in the main scanning direction, is crushed by the glass surface 135a at the position L4, and as a result, most of the leading edge of the document contacts the glass surface 135a of the document and cleans the glass surface 135a. As a highly rigid document or the documents (especially, various kinds of documents) are conveyed, the region to be cleaned of the glass surface 135a increases, and it is highly possible that an entire glass surface 135a is cleaned.

Figure 7:
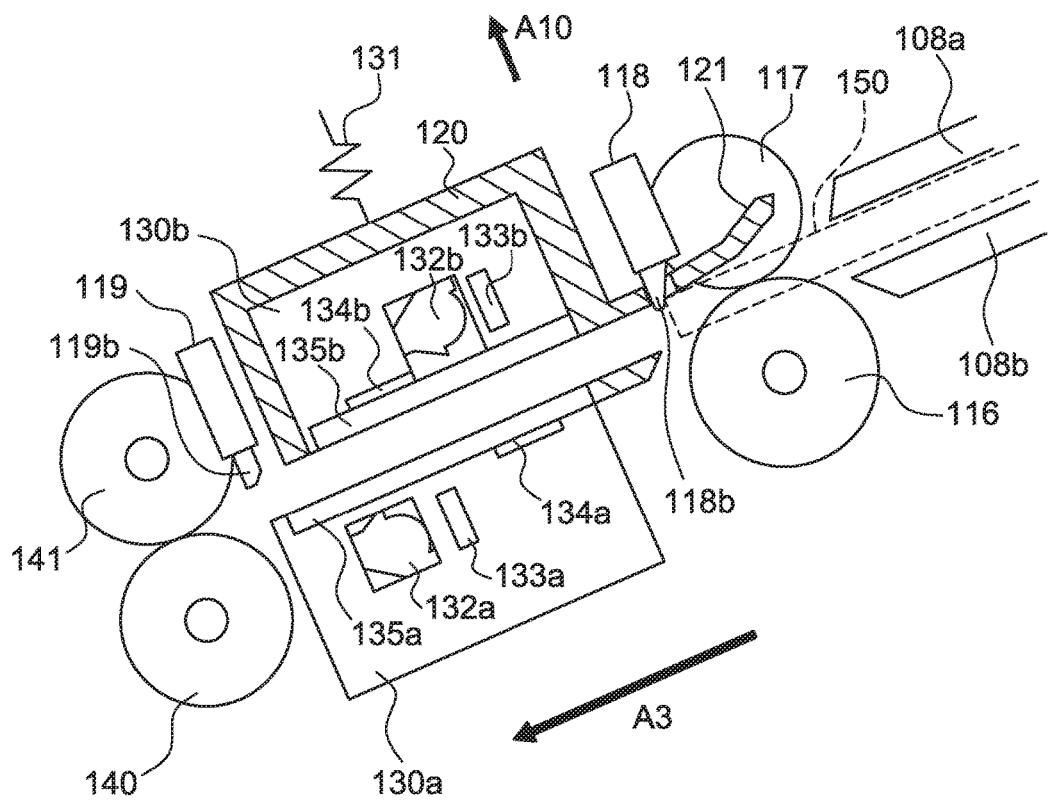
FIG. 7 is a diagram illustrating an operation of a second imaging unit 130b in document conveyance.

FIG. 7 is a diagram illustrating an operation of the second imaging unit 130b at the timing of document transfer. An example illustrated in FIG. 6 assumes that a thick medium, such as cardboard, banking card, or credit card, thicker than copy paper, print paper, or photo paper is transferred as a document 150.

When a document 150 in the form of a thick medium is transferred to the position of the imaging unit guide 120, the document 150 having a certain strength comes into contact with a guide member 121. This moves the imaging unit guide 120 and the second imaging unit 130b in a direction away from the transfer path, as indicated by an arrow A10. In this manner, the second imaging unit 130b is provided to be movable by the document transferred to the image reading apparatus 100. In contrast to this, even when a document 150 in the form of a thin medium such as copy paper, print paper, or photo paper is transferred to the position of the imaging unit guide 120, the second imaging unit 130b remains still at the first position.

The above-described embodied example is configured such that the second imaging unit 130b provided above the transfer path moves, but modification may be made such that the first imaging unit 130a provided below the transfer path moves.

In this case, the second imaging unit 130b is fixed to the upper housing 102, the first imaging unit 130a is supported by the lower housing 101 so as to be movable in a direction perpendicular to the document conveyance path. The first imaging unit 130a includes an imaging unit guide equipped with a guide member that guides and conveys a document between the first imaging unit 130a and the second imaging unit 130b so that the leading edge of the document comes into contact with the second imaging unit 130b.

Figure 8:
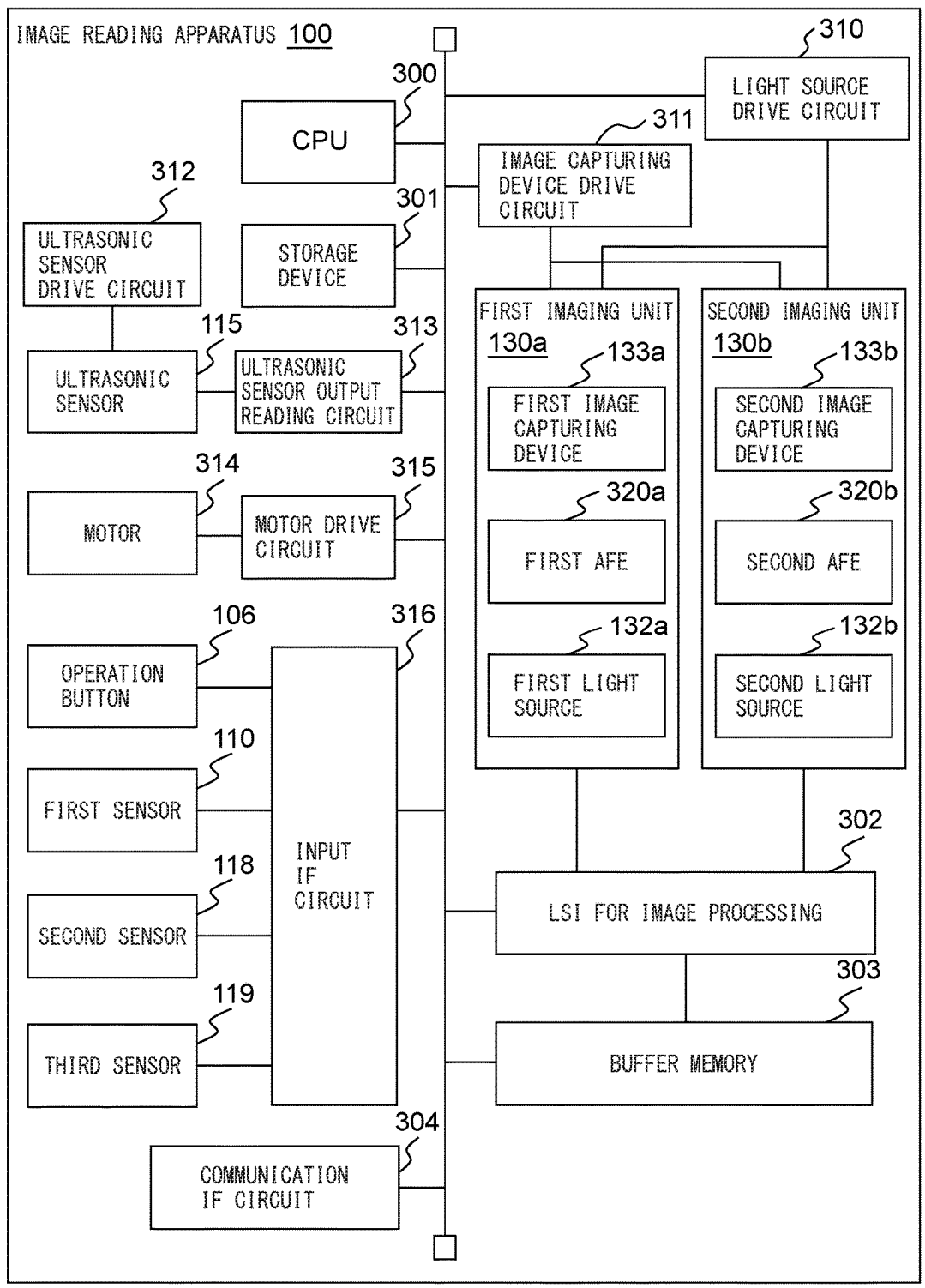
FIG. 8 is a diagram illustrating one example of a hardware configuration of the image reading apparatus 100.

FIG. 8 illustrates one example of a hardware configuration of the image reading apparatus 100. The image reading apparatus 100 includes a central processing unit (CPU) 300, a storage device 301, a large scale integration (LSI) 302 for image processing, a buffer memory 303, and a communication interface circuit 304 as well as the above-described configuration. In the attached drawings and the following description, an interface may be referred to as an IF.

Moreover, the image reading apparatus 100 includes a light source drive circuit 310, an image capturing module drive circuit 311, an ultrasonic sensor drive circuit 312, an ultrasonic sensor output reading circuit 313, a motor 314, a motor drive circuit 315, and an input IF circuit 316. The first imaging unit 130a and the second imaging unit 130b include a first analogue front-end processor (AFE) 320a and a second AFE 320b, respectively.

The CPU 300 controls an operation of the image reading apparatus 100 in accordance with a computer program stored in the memory 301. Furthermore, the CPU 300 may perform a part of or all of image processing for an image read by the image reading apparatus 100. Alternatively, a DSP (digital signal processor), an LSI (large scale integration), etc., may be used instead of the CPU 150. As another alternative, an ASIC (Application Specific Integrated Circuit), an FPGA (Field-Programming Gate Array), etc., may be used instead of the CPU 300.

The storage device 301 includes memory devices such as a RAM (Random Access Memory), a ROM (Read Only Memory), etc., a fixed disk device such as a hard disk, or a portable storage device such as a flexible disk, an optical disk, etc. The storage device 301 stores computer programs, databases, tables, etc., used for various kinds of processing of the image reading apparatus 100. The computer program may be installed on the storage device 301 from a computer-readable, non-transitory medium such as a compact disk read only memory (CD-ROM), a digital versatile disk read only memory (DVD-ROM), or the like by using a well-known setup program or the like. Further, the storage device 301 stores the read images.

The first AFE 320a and the second AFE 320b convert analogue image signals into digital signals to generate digital image data, the analogue image signals being output from the first image capturing device 133a of the first imaging unit 130a and the second image capturing device 133b of the second imaging unit 130b. The first AFE 320a and the second AFE 320b output the image data to the LSI 320 for image processing.

The LSI 302 for image processing performs predetermined image processing on the image data received from the imaging unit 130. The LSI 302 for image processing stores such image data in the buffer memory 303 as the image processing is performed. Alternatively, a DSP, an ASIC, or an FPGA, etc., may be used instead of the LSI 302 for image processing.

The communication IF circuit 304 is a wired or wireless communication interface between the image reading apparatus 100 and the information processing apparatus 10. The CPU 300 reads the image date from the buffer memory 303 to transmit the image data to the information processing apparatus 10 via the communication IF circuit 304.

The light source drive circuit 310 drives the first light source 132a of the first imaging unit 130a and the second light source 132b of the second imaging unit 130b in accordance with the control performed by the CPU 300. The image sensor drive circuit 311 drives the first image capturing device 133a of the first imaging unit 130a and the second image capturing device 133b of the second imaging unit 130b in accordance with the control performed by the CPU 300.

The ultrasonic sensor drive circuit 312 drives the ultrasonic wave transmitter 115a to cause the ultrasonic wave to be transmitted. The ultrasonic sensor output reading circuit 313 reads an output signal of the ultrasonic wave receiver 115b to transmit the output signal to the CPU 300 via a bus.

The motor 314 applies a rotational driving force to the sheet feeding roller 113, the retard roller 114, the first conveyance roller 116, and the second conveyance roller 140. A plurality of motors 314a may be used. The motor drive circuit 315 generates a driving current to be supplied to the motor 314 under the control of the CPU 300.

The input IF circuit 316 receives an operation detection signal output by the operation button 106, a first document detection signal output by the first sensor 110, a second document detection signal output by the second sensor 118, and a third document detection signal output by the third sensor 119 to transmit the signals to the CPU 300 via the bus.

The hardware configuration illustrated in FIG. 8 is merely an example for explanation of the embodied example. The image reading apparatus 100 may include any other hardware configurations as long as the operation described in the following may be performed.

Figure 9:
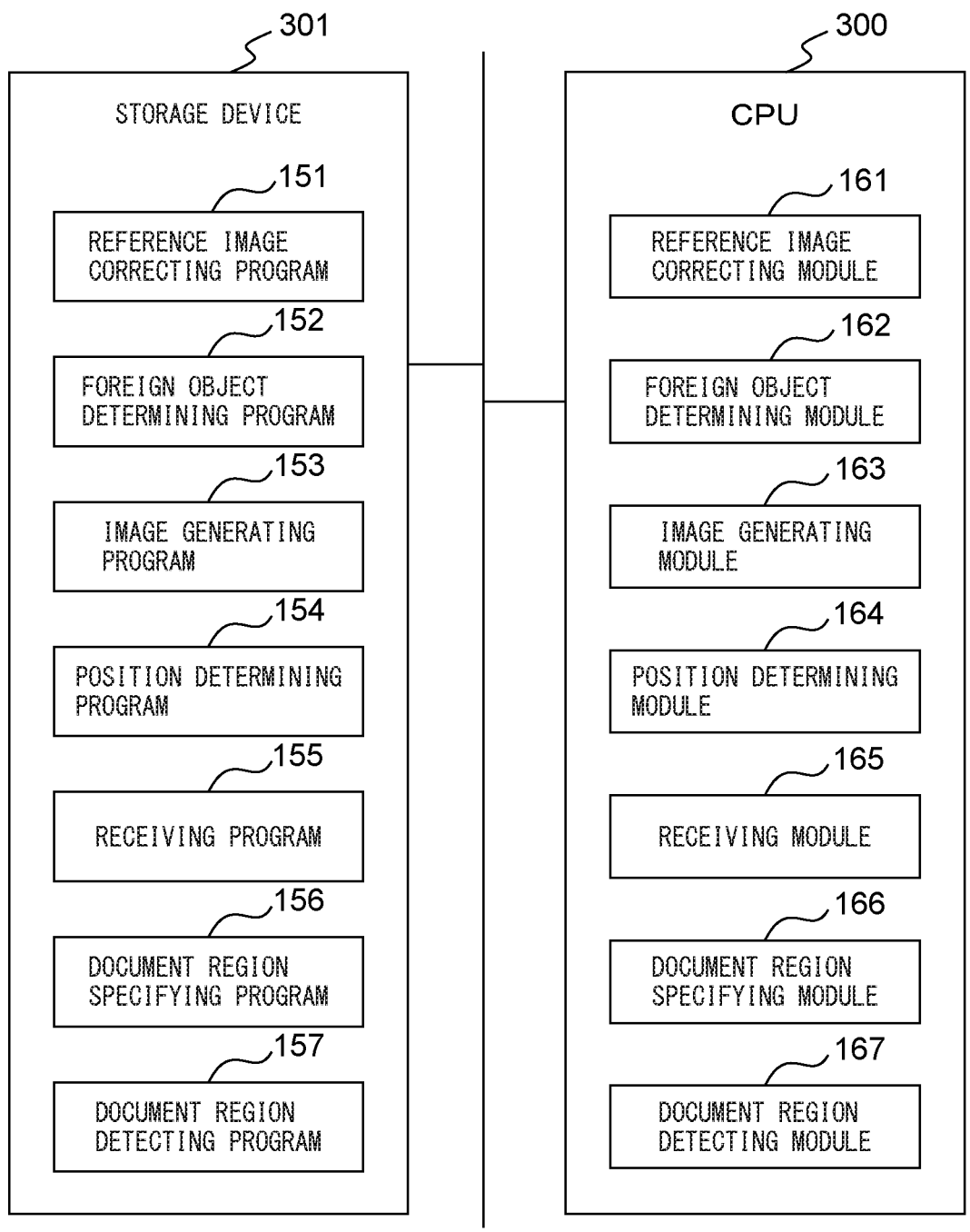
FIG. 9 is a diagram representing a schematic configuration of a storage device 301 and a CPU 300.

FIG. 9 is a diagram illustrating a schematic configuration of the storage device 301 and the CPU 300.

As illustrated in FIG. 9, the storage device 301 stores programs including a reference image correcting program 151, a foreign object determining program 152, an image generating program 153, a position determining program 154, a receiving program 155, a document region specifying program 156, and a document region detecting program 157. Each of these programs is a function module implemented by software operating on a processor. The CPU 300 reads the respective programs stored in the storage device 301, and operates in accordance with the respective read programs.

Hence, the CPU 300 functions as a reference image correcting module 161, a foreign object determining module 162, an image generating module 163, a position determining module 164, a receiving module 165, a document region specifying module 166, and a document region detecting module 167.

Figure 10:
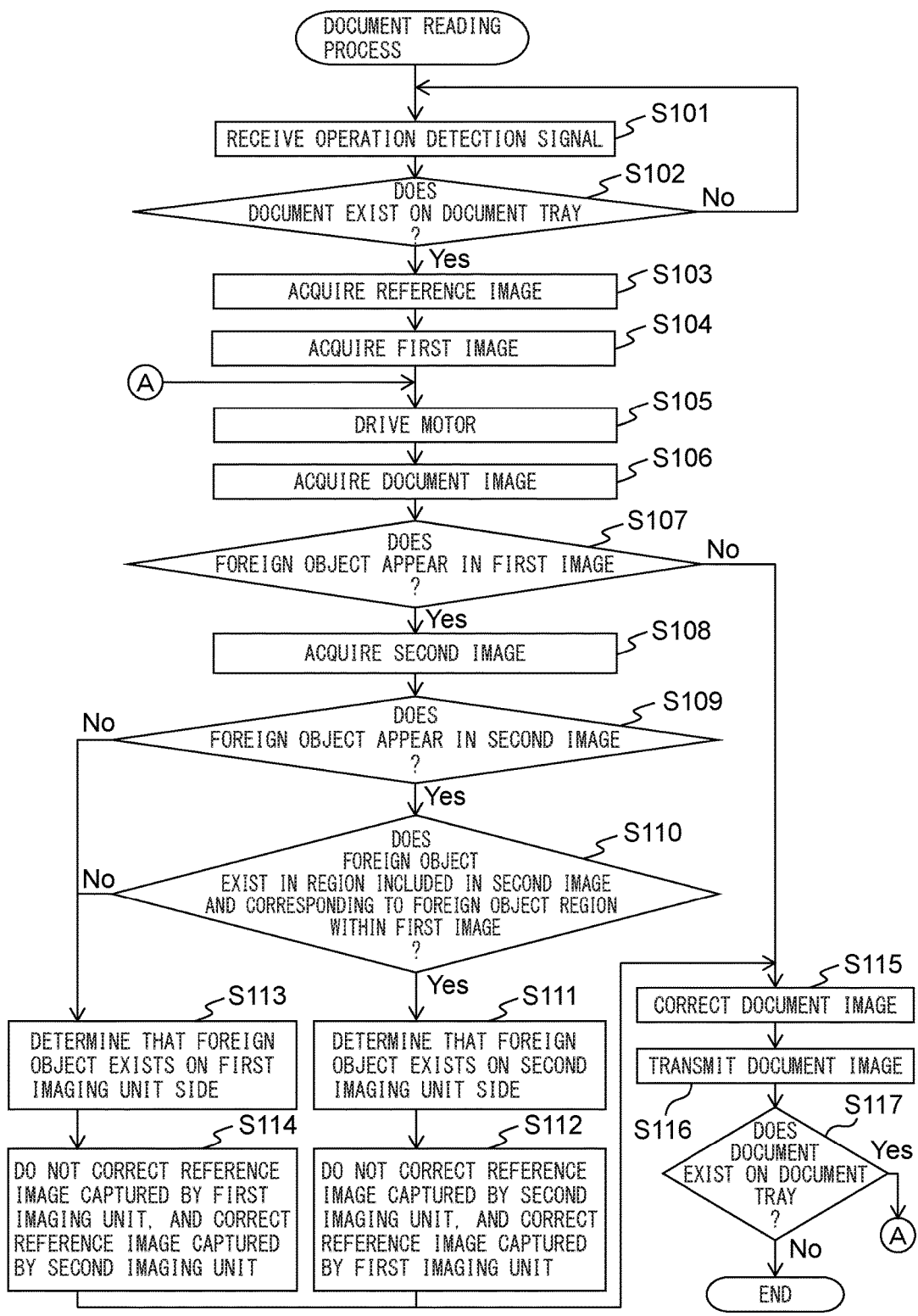
FIG. 10 is a flowchart representing an operational example of a document reading process.

FIG. 10 is a flowchart representing an operational example of a document reading process of the image reading apparatus 100.

Referring to the flowchart of FIG. 10, the following describes the operational example of the document reading process of the image reading apparatus 100. The flow of the operation described below is performed mainly by the CPU 300 based on the programs previously stored in the storage device 301, cooperating with the respective elements of the image reading apparatus 100.

First, the CPU 300 waits until a user presses down the operation button 106 for commanding reading of a document, and the CPU 300 receives from the operation button 106 an operation detection signal that commands reading of a document (step S101).

Next, the CPU 300 determines whether or not a document is placed on the document tray 103, based on a first document detection signal received from the first sensor 110 (step S102).

When a document is not placed on the document tray 103, the CPU 300 returns the process to the step S101, and waits until the CPU 300 receives the operation detection signal from the operation button 106 again.

When a document is mounted on the document tray 103, the reference image correcting module 161 causes the first image capturing device 133a and the second image capturing device 133b to capture reference images of the second reference member 134b and the first reference member 134a, respectively. The reference image correcting module 161 acquires the reference images from the first image capturing device 133a and the second image capturing device 133b via the first AFE 320a and the second AFE 320b, and stores the reference images in the storage device 301 (step S103). These reference images are used to correct a document image acquired by capturing an image of the document.

Next, the foreign object determining module 162 drives the image capturing device drive circuit 311 and causes the first image capturing device 133a and the second image capturing device 133b to capture first images (step S104). The foreign object determining module 162 acquires the first images from the first image capturing device 133a and the second image capturing device 133b via the first AFE 320a and the second AFE 320b, and stores the first images in the storage device 301. In other words, the first image captured by the first image capturing device 133a is an image of the second reference member 134b. The first image captured by the second image capturing device 133b is an image of the first reference member 134a. The foreign object determining module 162 may use the reference image acquired in step S103 as a first image and skip the process in step S104.

Next, the image generating module 163 drives the motor 314 via the motor drive circuit 315, to rotate the sheet feeding roller 113, the retard roller 114, the first conveyance roller 116, and the second conveyance roller 140 and to transfer a document (step S105).

The image generating module 163 causes the first image capturing device 133a and the second image capturing device 133b to capture respective surfaces of the transferred document to acquire document images. The reference image correcting module 161 then receives the document images from the first image capturing device 133a and the second image capturing device 133b via the first AFE 320a and the second AFE 320b (step S106).

Next, the foreign object determining module 162 determines whether a foreign object such as paper powder, dust, or paste appears in each of the first images captured by the first image capturing device 133a and the second image capturing device 133b (step S107). For each of all the pixels in the first images, for example, the foreign object determining module 162 determines whether or not the pixel has a gradation value within a predetermined range. When the pixel having gradation value outside the predetermined range exists, the foreign object determining module 162 determines that a foreign object appears in this pixel, i.e., a foreign object appears in the first image. On the other hand, when no pixels have a gradation value outside the predetermined range, the foreign object determining module 162 determines that no foreign objects appear in the first images.

A region where a foreign object appears in the image used by the foreign object determining module 162 for the determination, i.e., a region of pixels having gradation values outside the predetermined range is sometimes called a foreign object region in the following. The foreign object region is not limited to a region of pixels having gradation values outside the predetermined range, and may be a region whose center is a pixel (pixel whose gradation value is the peak value) having a gradation value most distant from the predetermined range and that is constituted by pixels within a predetermined distance from the pixel of this center. The predetermined range is determined, for example, to be a range that has a predetermined width (e.g., 10) and whose center is an average of gradation values of all the pixels included in the captured image of the second reference member 134b or the first reference member 134a in the foregoing experiment. Alternatively, the predetermined range may be determined to be a range that has a predetermined width and whose center is an average of gradation values of all the pixels included in the image used by the foreign object determining module 162 for the determination. The foreign object determining module 162 stores the result of determination as to whether a foreign object appears in the first image and a foreign object region detected from the first image in the storage device 301.

When no foreign object appears in each first image, the foreign object determining module 162 advances the process to step S115.

When the foreign object appears in the first image, the foreign object determining module 162 drives the image capturing module drive circuit 311 to cause one or both of the first image capturing device 133a and the second image capturing device 133b to capture the second image. The foreign object determining module 162 acquires the second image from one or both of the first image capturing device 133a and the second image capturing device 133b via the first AFE 320a and the second AFE 320b, and stores the second image in the storage device 301. (step S108). When a foreign object appears in the first image captured by the first image capturing device 133a, the foreign object determining module 162 causes the first image capturing device 133a to capture the second image. When a foreign object appears in the first image captured by the second image capturing device 133b, the foreign object determining module 162 causes the second image capturing device 133b to capture the second image. The second image captured by the first image capturing device 133a is an image of the second reference member 134b captured after a first image is captured as an image of the second reference member 134b and then the document is conveyed. The second image captured by the second image capturing device 133b is an image of the first reference member 134a captured after a first image is captured as an image of the first reference member 134a and then the document is conveyed.

The foreign object determining module 162 determines whether a foreign object appears in each second image captured by the first image capturing device 133a and/or the second image capturing device 133b, similarly to the process of step S107 (step S109).

When no foreign object appears in each second image, the foreign object determining module 162 advances the process to step S113.

When a foreign object appears in any second image, the position determining module 164 determines whether the foreign object appears in a region included in the second image and corresponding to the foreign object region within the first image (step S110). The position determining module 164 specifies the foreign object region within the first image and the foreign object region within the second image and calculates the ratio of the area (pixel count) of a region corresponding to the foreign object region within the second image of the foreign object region within the first image to the area (pixel count) of the entire foreign object region within the first image. The position determining module 164 determines that a foreign object appears in a region included in the second image and corresponding to the foreign object region within the first image when the calculated ratio is equal to or higher than a predetermined ratio (e.g., 80%), and that no foreign object appears in the region when the calculated ratio is lower than the predetermined ratio.

When it is determined that a foreign object appears in a region included in the second image and corresponding to the foreign object region within the first image, the position determining module 164 determines that the foreign object exists on the side of the second imaging unit 130b (step S111). When a foreign object appears in a region included in the second image and corresponding to the foreign object region within the first image, the foreign object is considered not to have been removed despite the fact that a document is conveyed. Therefore, the position determining module 164 determines that the foreign object exists not on the side of an imaging unit (first imaging unit 130a) contacted by the leading edge of the conveyed document, but on the side of an imaging unit (second imaging unit 130b) that is not contacted by the leading edge of the conveyed document.

In this case, the reference image correcting module 161 does not correct the reference image captured by the second imaging unit 130b and corrects the reference image captured by the first imaging unit 130a (step S112). The reference image correcting module 161 corrects the reference image by, for example, replacing each of gradation values of respective pixels included in the foreign object region within the reference image, with an average of gradation values of respective pixels included in a region neighboring this foreign object region and having a predetermined width.

When the foreign object exists on the image capturing device side, there is a high possibility that the foreign object appears at a position corresponding to the foreign object region in both of the reference image captured by this image capturing device and a document image subsequently captured. Thus, performing the shading correction using the reference image where the foreign object appears at the position corresponding to the foreign object region as it is enables removal of the foreign object appearing in the document image, and suppression of vertical stripe noise generation in the document image caused by the foreign object.

On the other hand, when the foreign object exists on the reference member side facing the image capturing device, there is a high possibility that the foreign object appears in the reference image captured by this image capturing device and at the position corresponding to the foreign object region. However, since a document exists between this image capturing device and the foreign object at the time of next capturing of a document image, there is a high possibility that the foreign object does not appear in the document image. Thus, the shading correction is performed using the reference image from which the foreign object has been removed. Thereby, the document image can be appropriately corrected.

In view of this, when a foreign object exists and is on the side of the second imaging unit 130b (second reference member 134b), the reference image correcting module 161 does not correct the reference image captured by the second imaging unit 130b (second image capturing device 133b) and does not remove the foreign object from this reference image. In this case, however, the reference image correcting module 161 corrects the reference image captured by the first imaging unit 130a (first image capturing device 133a) and removes the foreign object from this reference image.

When no foreign object appears in a region included in the second image and corresponding to the foreign object region within the first image, the position determining module 164 determines that the foreign object exists on the side of the first imaging unit 130a (step S113). When no foreign object appears in a region included in the second image and corresponding to the foreign object region within the first image, a foreign object is considered to have been removed upon document conveyance. Therefore, the position determining module 164 determines that the foreign object exists not on the side of an imaging unit (second imaging unit 130b) that is not contacted by the leading edge of the conveyed document, but on the side of an imaging unit (first imaging unit 130a) contacted by the leading edge of the conveyed document.

In this case, the reference image correcting module 161 does not correct the reference image captured by the first imaging unit 130a and corrects the reference image captured by the second imaging unit 130b (step S114). In other words, when a foreign object exists and is on the side of the first imaging unit 130a (first reference member 134a), the reference image correcting module 161 does not correct the reference image captured by the first imaging unit 130a (first image capturing device 133a) and does not remove the foreign object from this reference image. In this case, however, the reference image correcting module 161 corrects the reference image captured by the second imaging unit 130b (second image capturing device 133b) and removes the foreign object from this reference image.

Note, however, that when the foreign object exists on the side of an imaging unit (first imaging unit 130a) contacted by the leading edge of the conveyed document, the foreign object may be removed by the leading edge of the document to be conveyed and may not appear in the document image. In view of this, when the foreign object exists on the side of the first imaging unit 130a contacted by the leading edge of the conveyed document, the reference image correcting module 161 may correct the reference image captured by the first imaging unit 130a and remove the foreign object from this reference image. In other words, when the foreign object exists on the side of the first imaging unit 130a and the guide member 121 conveys a document so that the leading edge of the document comes into contact with the first imaging unit 130a, the reference image correcting module 161 corrects the reference image captured by the first imaging unit 130a.

In this manner, the position determining module 164 determines whether the foreign object exists on the side of the first imaging unit 130a or on the side of the second imaging unit 130b, based on whether a foreign object appears in a region included in the second image and corresponding to the foreign object region within the first image.

When it is determined in step S107 that no foreign object exists in each first image, the reference image correcting module 161 does not correct each reference image.

Next, the image generating module 163 executes shading correction on the respective document images, using the respective reference images (step S115).

Next, the image generating module 163 transmits the corrected document images to the information processing device 10 via the communication IF circuit 304 (step S116).

Next, the CPU 300 determines whether a document still exists on the document tray 103, based on a first document detection signal received from the first sensor 110 (step S117).

When the document still exists on the document tray 103, the CPU 300 returns the process to the step S105, and repeats the processes of the steps S105 to S117. On the other hand, when a document does not exist on the document tray 103, the CPU 300 terminates a series of the processes.

The CPU 300 may return the process not to step S105 but to step S103, in which a reference image and/or a first image is acquired again every time one document is conveyed. In this case, the CPU 300 determines whether the conveyed document (its trailing edge) has passed through the position of the third sensor 119, i.e., has passed through the position of the imaging unit 130, based on a third document detection signal received from the third sensor 119. After the conveyed document passes through the position of the imaging unit 130, the CPU 300 returns the process to step S103. Hence, the image reading apparatus 100 can accurately determine the position of a new foreign object, which may occur in the document conveyance path during document conveyance.

The CPU 300 may even use a second image just before acquired as a reference image and a first image in the second and subsequent execution of the processes in steps S105 to S117. Hence, the image reading apparatus 100 can accurately determine the position of a new foreign object, which may occur in the document conveyance path during document conveyance, without acquiring a reference image and a first image again. Therefore, the image reading apparatus 100 can suppress vertical stripe noise in the document image due to the occurrence of a new foreign object, while curbing an increase in process load.

In the second and subsequent execution of the process in step S107, the foreign object determining module 162 uses a foreign object determination result and a foreign object region obtained when the process in step S107 is executed for the first time. Hence, the image reading apparatus 100 can reduce the process load and can thus shorten the time taken for image reading.

Respective types of information including a reference image, a first image, and a foreign object region may also be stored in the storage device 301 even after the end of a document reading process and used when a document reading process is performed again. In this case, the image reading apparatus 100 includes a sensor that detects opening and closing of the upper housing 102, and when the upper housing 102 is opened, the CPU 300 erases the respective types of information from the storage device 301 by regarding the document conveyance path as having been cleaned by the user. Alternatively, when the upper housing 102 is opened, the CPU 300 may determine whether each image has a change by a comparison between respective images acquired before and after the opening of the upper housing 102 and erase the respective types of information from the storage device 301 only when each image has a change.

The CPU 300 may even determine whether a conveyance abnormality such as a document jam or multifeed has occurred, and, when a conveyance abnormality has occurred, erase the respective types of information from the storage device 301 by regarding the document conveyance path as being cleaned by the user after the occurrence of the abnormality.

The CPU 300 may omit a foreign object determining process for specific regions in a first image and a second image, instead of performing a foreign object determining process for all regions in the first image and the second image.

For example, the CPU 300 may omit a foreign object determining process for regions included in a first image and a second image and corresponding to regions where a document does not appear in a document image. In this case, the receiving module 165 receives via the input IF circuit 316, the size of the conveyed document that has been set by the user via the operation button 106. The document region specifying module 166 specifies a document region where a document appears in a document image and a non-document region where the document does not appear in the document image, based on the size received by the receiving module 165. When, for example, the side guides 104a and 104b are provided to be movable symmetrically about the central position in a direction perpendicular to the document transfer direction, the document region specifying module 166 specifies as a document region, a region having a width corresponding to the size of the document assuming that a position corresponding to this central position in the document image is the center. When one side guide is fixed in position and only the other side guide is movably provided, the document region specifying module 166 specifies a region having a width corresponding to the size of the document as a document region, from the position of the side guide fixed in position, in the document image. The document region specifying module 166 specifies a region other than the document region as a non-document region in the document image.

The foreign object determining module 162 does not determine whether a foreign object appears, for a region included in the first image and corresponding to the non-document region. The position determining module 164 does not determine whether the foreign object exists on the side of the first imaging unit 130a or on the side of the second imaging unit 130b, for the region included in the first image and corresponding to the non-document region. The reference image correcting module 161 does not correct a region included in the reference image and corresponding to the non-document region.

In the non-document region within the document image, the document does not appear and the reference member 134 appears. This means that when a foreign object appears in the region included in the reference image and corresponding to the non-document region, the foreign object is highly likely to appear in the non-document region within the document image as well. Therefore, for the region included in the reference image and corresponding to the non-document region, the foreign object appearing in the non-document region (background) of the document image can be removed by performing shading correction directly using this reference image. By removing the foreign object from the background, the image reading apparatus 100 can accurately extract a document region from the document image in a cropping process. By omitting a foreign object determining process for the region included in the first image and corresponding to the non-document region, the image reading apparatus 100 can reduce the process load and can thus shorten the time taken for image reading.

When the size of the conveyed document is set in advance, since the conveyance paths of the second and subsequent documents are identical to that of the first document, the determination result obtained by a foreign object determining process is highly likely to stay the same.

Therefore, the CPU 300 may skip the processes in steps S107 to S112 in the second and subsequent execution of the processes in steps S105 to S117. In this case, in step S115, the CPU 300 corrects the document image using a reference image used when the process in step S115 is executed for the first time.

The document region detecting module 167 may detect a document region and a non-document region, instead of specifying a document region and a non-document region by the document region specifying module 166, based on the size received by the receiving module 165. In this case, the document region detecting module 167 detects a region where a document appears as a document region, and a region where the document does not appear as a non-document region, from the document image, using a known image processing technique. For example, the document region detecting module 167 extracts edge pixels in which the difference in pixel value between adjacent pixels is equal to or larger than a predetermined value, from the document image, and extracts lines using, e.g., Hough transformation or the least squares method from the edge pixels. The document region detecting module 167 detects a rectangular region formed by four extracted lines consisting of pairs of two nearly perpendicular lines as a document region, and a region other than the document region as a non-document region.

In this case as well, the foreign object determining module 162 does not determine whether a foreign object appears, for a region included in the first image and corresponding to the non-document region. The position determining module 164 does not determine whether the foreign object exists on the side of the first imaging unit 130a or on the side of the second imaging unit 130b, for the region included in the first image and corresponding to the non-document region. The reference image correcting module 161 does not correct a region included in the reference image and corresponding to the non-document region. Thus, the image reading apparatus 100 can reduce the process load and can thus shorten the time taken for image reading.

The conveyance path of each document varies depending on the size of the conveyed document, the mount position on the document tray, etc. However, since a foreign object adhering to the conveyance path of each document is removed upon conveyance of this document, the determination result obtained by a foreign object determining process is highly likely to stay the same for regions corresponding to the conveyance paths of documents conveyed in the past, i.e., document regions determined in the past. Therefore, the CPU 300 may use the determination result obtained by a foreign object determining process for any document region determined in the past.

For example, in steps S109 and S110, the foreign object determining module 162 and the position determining module 164 store in the storage device 301, information indicating a document region, the result of determination as to whether a foreign object appears in the second image, a foreign object region detected from the second image, the determination result of the position of the foreign object, etc. In newly executing the process in step S109, the foreign object determining module 162 uses the respective types of information stored in the storage device 301 for a region corresponding to the document region stored in the storage device 301 and determines whether a foreign object appears only for the remaining region. Similarly, in newly executing the process in step S110, the position determining module 164 uses the respective types of information stored in the storage device 301 for the region corresponding to the document region stored in the storage device 301 and determines the position of the foreign object only for the remaining region. Thus, the image reading apparatus 100 can appropriately determine the position of the foreign object while curbing an increase in process load.

The CPU 300 may omit a foreign object determining process for a region included in the first image and corresponding to the position at which the conveyance module is placed in the main scanning direction. In this case, the position at which a set of the sheet feeding roller 113 and the retard roller 114, a set of the first conveyance roller 116 and the first driven roller 117, or a set of the second conveyance roller 140 and the second driven roller 141 are placed in the main scanning direction is stored in the storage device 301 in advance as the position of the conveyance module.

The foreign object determining module 162 does not determine whether a foreign object appears, for a region included in the first image and corresponding to the position at which the conveyance module is placed in the main scanning direction. The position determining module 164 does not determine whether the foreign object exists on the side of the first imaging unit 130a or on the side of the second imaging unit 130b, for the region included in the first image and corresponding to the position at which the conveyance module is placed in the main scanning direction. The reference image correcting module 161 does not correct a region included in the reference image and corresponding to the position at which the conveyance module is placed in the main scanning direction.

At the position of each roller placed in the document conveyance path, a projection or a recess, for example, is present and easily collects paper dust. Due to the presence of paper dust collecting at the position of each roller, dirt is highly likely to adhere to the position of the first imaging unit 130a corresponding to the position at which this roller is placed in the main scanning direction. When the dirt appears in both a first image and a second image acquired before and after document conveyance, the position of the foreign object may not be determined precisely. The image reading apparatus 100 can curb wasteful increases in process load and image reading time by omitting a foreign object determining process for a region where the determination accuracy of the position of a foreign object is low.

The CPU 300 may even omit a foreign object determining process for regions included in the first image and corresponding to the edges of a conveyed document in the main scanning direction. In this case, the image reading apparatus 100 sets as the edges of the document, positions defined in the first image and corresponding to the edges (two edges) in the main scanning direction of a document region specified by the document region specifying module 166 or a document region detected by the document region detecting module 167. The image reading apparatus 100 sets regions within a predetermined range from the positions of the edges of the document in the first image as regions corresponding to the edges of the document.

The foreign object determining module 162 does not determine whether a foreign object appears, for regions included in the first image and corresponding to the edges of the conveyed document in the main scanning direction. The position determining module 164 does not determine whether the foreign object exists on the side of the first imaging unit 130a or on the side of the second imaging unit 130b, for the regions included in the first image and corresponding to the edges of the conveyed document in the main scanning direction. The reference image correcting module 161 does not correct regions included in the reference image and corresponding to the edges of the conveyed document in the main scanning direction.

At the position through which the two edges of the document pass in the document conveyance path, a foreign object is highly likely to deposit without being removed. Therefore, since the deposited foreign object may appear in both a first image and a second image acquired before and after document conveyance, the position of the foreign object may not be determined precisely. The image reading apparatus 100 can curb wasteful increases in process load and image reading time by omitting a foreign object determining process for a region where the determination accuracy of the position of a foreign object is low.

When a foreign object appears in regions included in a plurality of document images and corresponding to a foreign object region within the first image, the CPU 300 may omit a foreign object determining process for regions included in subsequently acquired first images and corresponding to the foreign object region.

The foreign object determining module 162 determines whether a foreign object appears in a region corresponding to a foreign object region within the first image, for document images of the front and back surfaces of at least a predetermined number of (e.g., two) documents sequentially captured by the image capturing device 133. When a foreign object appears in a document image of a surface on the side of an imaging unit (second imaging unit 130b) that is not contacted by the leading edge of the document, the foreign object is highly likely to exist on the side of the second imaging unit 130b. When a foreign object appears in a document image of a surface on the side of an imaging unit (first imaging unit 130a) contacted by the leading edge of the document, the foreign object is highly likely to be identified as a foreign object such as glue that adheres on the side of the first imaging unit 130a and remains unremoved even after document conveyance.

In view of this, when a foreign object appears in all regions included in respective document images of a surface on the side of an imaging unit contacted by the leading edge of the document, and corresponding to a foreign object region, the foreign object determining module 162 does not determine whether a foreign object appears, for regions included in subsequently acquired first images and corresponding to the foreign object region. In this case, the position determining module 164 does not determine whether the foreign object exists on the side of the first imaging unit 130a or on the side of the second imaging unit 130b, for the regions included in subsequently acquired first images and corresponding to the foreign object region. Again in this case, the reference image correcting module 161 does not correct a region included in the reference image and corresponding to the foreign object region.

When a foreign object such as glue adheres to the imaging unit, since the foreign object may appear in both a first image and a second image acquired before and after document conveyance, the position of the foreign object may not be determined precisely. The image reading apparatus 100 can curb wasteful increases in process load and image reading time by omitting a foreign object determining process for a region where the determination accuracy of the position of a foreign object is low.

The CPU 300 may even omit a foreign object determining process when the number of document images captured by the image reading apparatus 100 is equal to or larger than a predetermined number (e.g., 100,000).

The CPU 300 stores the number of captured document images in the storage device 301 and updates this number of captured document images every time an image of a document is captured. The foreign object determining module 162 does not determine whether a foreign object appears in a first image and a second image when the number of document images captured by the image reading apparatus 100 is equal to or larger than the predetermined number. In this case, the position determining module 164 does not determine whether the foreign object exists on the side of the first imaging unit 130a or on the side of the second imaging unit 130b, and the reference image correcting module 161 does not correct the reference image.

When the image reading apparatus 100 captures images of a large number of documents, since dirt is highly likely to adhere to the imaging unit 130, the dirt may appear in both a first image and a second image acquired before and after document conveyance, and the position of the foreign object may not be determined precisely. The image reading apparatus 100 can curb wasteful increases in process load and image reading time by omitting a foreign object determining process for a region where the determination accuracy of the position of a foreign object is low.

The CPU 300 may even omit a foreign object determining process when the number of foreign objects appearing in the first image is equal to or larger than a second predetermined number (e.g., 10).

The foreign object determining module 162 does not determine whether a foreign object appears in a first image and a second image when the number of foreign objects appearing in the first image is equal to or larger than the second predetermined number. In this case, the position determining module 164 does not determine whether the foreign object exists on the side of the first imaging unit 130a or on the side of the second imaging unit 130b, and the reference image correcting module 161 does not correct the reference image.

When a large number of foreign objects appear in the first image, since the entire imaging unit 130 may be contaminated by dirt, the dirt may not be sufficiently removed even after document conveyance, and the positions of the foreign objects may not be determined precisely. The image reading apparatus 100 can curb wasteful increases in process load and image reading time by omitting a foreign object determining process for a region where the determination accuracy of the position of a foreign object is low.

The CPU 300 may be made to hardly detect a foreign object, instead of omitting a foreign object determining process, in each of the above-mentioned cases. For example, the foreign object determining module 162 is made to hardly detect a foreign object by setting a large predetermined width (threshold) for a predetermined range used in step S107.

The CPU 300 may determine the position of a foreign object and correct a reference image and a document image after all documents mounted on the document tray 103 are conveyed, instead of determining the position of a foreign object and correcting a reference image and a document image every time a document is conveyed. As described above, conveying a plurality of documents widens a region to be cleaned on the glass surface 135a, so that the entire glass surface 135a is highly likely to be cleaned. Therefore, the determination accuracy of the position of a foreign object can be improved by determining the position of the foreign object after a plurality of documents are conveyed.

As described in detail above, by operation in accordance with the flowchart illustrated in FIG. 10, when a foreign object appears in an image captured before document conveyance, the image reading apparatus 100 determines the position of the foreign object, based on whether the foreign object remains in an image captured after document conveyance. Thus, the image reading apparatus 100 can accurately determine the existing position of the foreign object. This enables the image reading apparatus 100 to appropriately determine whether or not to correct the reference image used in the shading correction, and enables the image reading apparatus 100 to generate an appropriate reference image. Therefore, the image reading apparatus 100 can suppress generation of vertical stripe noise in a document image caused by a foreign object.

Figure 11:
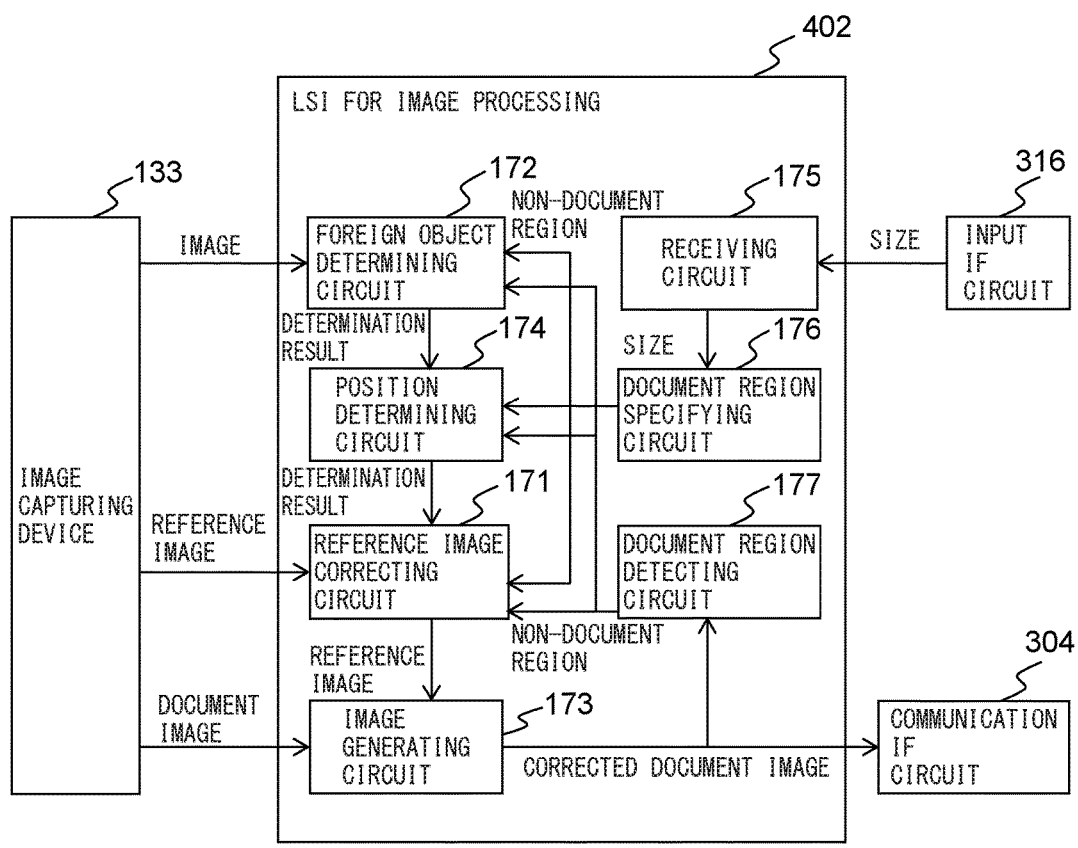
FIG. 11 is a block diagram illustrating a schematic configuration of another LSI 402 for image processing.

FIG. 11 is a block diagram illustrating a schematic configuration of an LSI 402 for image processing in an image reading apparatus according to another embodiment.

The LSI 402 for image processing is used instead of the LSI 302 for image processing in the image reading apparatus 100, and substitutes for the CPU 300 to perform the foreign object determining process and the document reading process. The LSI 402 for image processing includes, e.g., a reference image correcting circuit 171, a foreign object determining circuit 172, an image generating circuit 173, a position determining circuit 174, a receiving circuit 175, a document region specifying circuit 176, and a document region detecting circuit 177.

The reference image correcting circuit 171 is one example of a reference image correcting module and has the same function as the reference image correcting module 161. The reference image correcting circuit 171 acquires a reference image from the image capturing device 133, corrects the reference image in accordance with the position of a foreign object, and outputs the reference image to the image generating circuit 173.

The foreign object determining circuit 172 is one example of a foreign object determining module and has the same function as the foreign object determining module 162. The foreign object determining circuit 172 acquires a first image and a second image from the image capturing device 133, determines whether a foreign object appears in the first image and the second image, and outputs the determination result to the position determining circuit 174.

The image generating circuit 173 is one example of an image generating module, and has the same function as that of the image generating module 163. The image generating circuit 173 acquires a document image from the image capturing device 133, uses the reference image to correct the document image, and transmits the corrected document image to the information processing device 10 via the communication IF circuit 304.

The position determining circuit 174 is one example of a position determining module and has the same function as the position determining module 164. When a foreign object appears in the first image, the position determining circuit 174 determines the position of the foreign object, based on the second image, and outputs the determination result to the reference image correcting circuit 171.

The receiving circuit 175 is one example of a receiving module and has the same function as the receiving module 165. The receiving circuit 175 receives the size of the conveyed document from the input IF circuit 316.

The document region specifying circuit 176 is one example of a document region specifying module and has the same function as the document region specifying module 166. The document region specifying circuit 176 acquires the size of a document from the receiving circuit 175, specifies a document region and a non-document region in the document image, and outputs information concerning the specified non-document region to the reference image correcting circuit 171, the foreign object determining circuit 172, and the image generating circuit 173.

The document region detecting circuit 177 is one example of a document region detecting module and has the same function as the document region detecting module 167. The document region detecting circuit 177 acquires a document image from the image generating circuit 173, detects a document region and a non-document region in the document image, and outputs information concerning the detected non-document region to the reference image correcting circuit 171, the foreign object determining circuit 172, and the image generating circuit 173.

As described in detail above, the image reading apparatus can accurately determine an existing position of a foreign object, also in the case of using the LSI 402 for image processing.

REFERENCE SIGNS LIST 100 image reading apparatus
121 guide member
130a first imaging unit
130b second imaging unit
133a first image capturing device
133b second image capturing device
134a first reference member
134b second reference member
161 reference image correcting module
162 foreign object determining module
164 position determining module
165 receiving module
166 document region specifying module
167 document region detecting module

The invention claimed is:

1. An image reading apparatus comprising:
a first unit including an image capturing device for capturing a first image and a second image;
a second unit including a reference member provided at a position facing the image capturing device;
a conveyance mechanism for conveying a document between the first unit and the second unit so that a leading edge of the document comes into contact with one of the first unit and the second unit; and
a processor configured to
determine whether a foreign object appears in the first image and the second image, and
determine when a foreign object appears in the first image, whether the foreign object exists on a side of the first unit or on a side of the second unit, based on whether the foreign object appears in a region included in the second image and corresponding to a region where the foreign object appears in the first image,
wherein the first image is a captured image of the reference member, and the second image is an image of the reference member captured after the first image is captured and the document is conveyed.

2. The image reading apparatus according to claim 1, wherein when a foreign object does not appear in the region included in the second image and corresponding to the region where the foreign object appears in the first image, the processor determines that the foreign object exists on a side of a unit contacted by the leading edge of the document, and when a foreign object appears in the region included in the second image and corresponding to the region where the foreign object appears in the first image, the processor determines that the foreign object exists on a side of a unit that is not contacted by the leading edge of the document.

3. The image reading apparatus according to claim 1, wherein
the image capturing device further captures a reference image for correcting a document image of the document, and wherein
the processor does not correct the reference image when the foreign object exists on the side of the first unit and corrects the reference image when the foreign object exists on the side of the second unit.

4. The image reading apparatus according to claim 3, wherein when the foreign object exists on the side of the first unit and the conveyance mechanism conveys the document so that the leading edge of the document comes into contact with the first unit, the processor corrects the reference image.

5. The image reading apparatus according to claim 1, wherein the processor
detects a region where the document appears from a document image of the document,
does not determine whether a foreign object appears, for a region included in the first image and corresponding to the region where the document does not appear in the document image, and
does not determine whether the foreign object exists on the side of the first unit or on the side of the second unit, for the region included in the first image and corresponding to the region where the document does not appear in the document image.

6. The image reading apparatus according to claim 1, wherein the processor
receives a size of the conveyed document,
specifies a region where the document does not appear in a document image of the document, based on the size received by the processor,
does not determine whether a foreign object appears, for a region included in the first image and corresponding to the region where the document does not appear in the document image, and
does not determine whether the foreign object exists on the side of the first unit or on the side of the second unit, for the region included in the first image and corresponding to the region where the document does not appear in the document image.

7. The image reading apparatus according to claim 1, further comprising a roller for conveying the document, wherein the processor does not determine whether a foreign object appears, for a region included in the first image and corresponding to a position at which the roller is placed in a main scanning direction, and does not determine whether the foreign object exists on the side of the first unit or on the side of the second unit, for the region included in the first image and corresponding to the position at which the roller is placed in the main scanning direction.

8. The image reading apparatus according to claim 1, wherein the processor does not determine whether a foreign object appears, for a region included in the first image and corresponding to an edge of the conveyed document in a main scanning direction, and does not determine whether the foreign object exists on the side of the first unit or on the side of the second unit, for the region included in the first image and corresponding to the edge of the conveyed document in the main scanning direction.

9. The image reading apparatus according to claim 1, wherein the conveyance mechanism conveys the document between the first unit and the second unit so that the leading edge of the document comes into contact with the first unit, wherein the image capturing device further captures a plurality of document images, wherein the processor, when a foreign object appears in all regions included in the plurality of document images and corresponding to the region where the foreign object appears in the first image, does not determine whether a foreign object appears, for a region included in a subsequently acquired first image and corresponding to a region where the foreign object appears in the first image, and wherein the processor does not determine whether the foreign object exists on the side of the first unit or on the side of the second unit, for the region included in the subsequently acquired first image and corresponding to the region where the foreign object appears in the first image.

10. The image reading apparatus according to claim 1, wherein the processor does not determine whether a foreign object appears in the first image and the second image when a number of document images captured by the image reading apparatus is not less than a predetermined number, or when a number of foreign objects appearing in the first image is not less than a second predetermined number.

11. A control method of an image reading apparatus including a first unit including an image capturing device for capturing a first image and a second image, a second unit including a reference member provided at a position facing the image capturing device, and a conveyance mechanism for conveying a document between the first unit and the second unit so that a leading edge of the document comes into contact with one of the first unit and the second unit, the method comprising:

determining whether a foreign object appears in the first image and the second image; and determining, when a foreign object appears in the first image, whether the foreign object exists on a side of the first unit or on a side of the second unit, based on whether the foreign object appears in a region included in the second image and corresponding to a region where the foreign object appears in the first image, wherein the first image is a captured image of the reference member, and the second image is an image of the reference member captured after the first image is captured and the document is conveyed.

12. A computer-readable, non-transitory medium storing a computer program, wherein the computer program causes an image reading apparatus including a first unit including an image capturing device for capturing a first image and a second image, a second unit including a reference member provided at a position facing the image capturing device, and a conveyance mechanism for conveying a document between the first unit and the second unit so that a leading edge of the document comes into contact with one of the first unit and the second unit, to execute a process, the process comprising:

determining whether a foreign object appears in the first image and the second image; and determining, when a foreign object appears in the first image, whether the foreign object exists on a side of the first unit or on a side of the second unit, based on whether the foreign object appears in a region included in the second image and corresponding to a region where the foreign object appears in the first image, wherein the first image is a captured image of the reference member, and the second image is an image of the reference member captured after the first image is captured and the document is conveyed.

* * * * *